Feb. 11, 1947. G. H. BROWN ET AL 2,415,624
LIGHT-SENSITIVE LAYERS HAVING ULTRAVIOLET LIGHT FILTERS
Filed Jan. 17, 1945
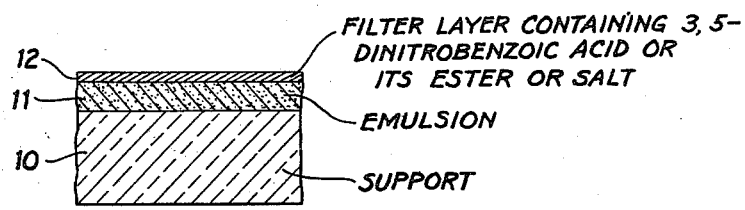
GORDON H. BROWN
PAUL W. VITTUM
EDWIN E. JELLEY
INVENTORS
BY
ATTORNEYS Patented Feb. 11, 1947

2,415,624

UNITED STATES PATENT OFFICE 2,415,624

LIGHT-SENSITIVE LAYERS HAVING ULTRAVIOLET LIGHT FILTERS

Gordon H. Brown, Paul W. Vittum, and Edwin E. Jelley, Rochester, N. Y., assignors to Eastman Kodak Company, Rochester, N. Y., a corporation of New Jersey Application January 17, 1945, Serial No. 573,216

4 Claims. (Cl. 95—8)

This invention relates to filters which absorb ultraviolet light and particularly to such filters as used with photographic sensitive material.

It is known that certain materials, such as cellulosic films and photographic layers are affected by ultraviolet light rays, these rays in the case of sensitive photographic layers sometimes causing an undesired exposure of the layer. Photographic silver halide emulsions are sensitive to blue, violet, and ultraviolet regions of the spectrum in addition to any other sensitivity which may be given them and in the exposure of such material, it is frequently desirable to prevent the action of ultraviolet light on the sensitive emulsion. This is especially true in the case of photographic materials designed for use in color photography where the film has been sensitized to the longer wave length regions where it is desirable to record only the rays of the visible spectrum.

We have discovered an ultraviolet absorbing material which may be incorporated in cellulose ester or synthetic resin materials or in gelatin layers and which absorbs the ultraviolet light without absorbing any appreciable amount of visible light. These materials may be used in filters to be placed over the camera lens or may be incorporated as a layer of the sensitive photographic material.

In the accompanying drawing the single figure is a sectional view of a sensitive photographic film having an ultraviolet filter layer constructed according to our invention.

The compounds which we propose to use as ultraviolet absorbing materials are 3,5-dinitrobenzoic acid, and the salts and esters of said acid. Esters which may be used include the methyl, ethyl, butyl, and benzyl esters and suitable salts are the sodium, lithium, potassium and barium salts. The esters may be added directly to a cellulose ester dope or to a synthetic resin dope and coated directly. Other esters containing substituent groups which lend water solubility, and the water-soluble salts of 3,5-dinitrobenzoic acid, may be incorporated directly in gelatin for use as filter layers.

The light absorption range of these compounds varies to some extent with the particular compound used but, in general, the 3,5-dinitrobenzoic acid and the esters and salts of 3,5-dinitrobenzoic acid absorb rather completely in the long wave length ultraviolet region of 300 to 400 millimicrons and absorb very little visible light.

In making a light filter according to our invention, a suitable amount of one or more of the esters or salts of 3,5-dinitrobenzoic acid is incorporated in a suitable colloidal material, such as a gelatin agar, cellulose esters or ethers or synthetic resins. These resins include the polyvinyl esters, such as polymerized vinyl acetate which is known, for example, under the trade name Gelva, the preparation of which is described in U. S. Patents 1,241,738, 1,586,803, and 1,710,825. A further type of resin which may be used is the polyvinyl acetal type. These resins are condensation products of partially or completely hydrolyzed polyvinyl acetate with an aldehyde, such as formaldehyde, acidaldehyde, or butyraldehyde and are known as polyvinyl acetals. They are sold under various trade names, such as Formvar and Alvar. A still further type of resin which we may use is the alkyd type which is a condensation product of a polybasic acid and a polyhydroxy alcohol. An example of this type of resin is glyptal which is a condensation product of glycerin and phthalic acid or phthalic anhydride.

These ultraviolet filtering materials may be used over the camera lens or may be applied to photographic film wherever it is desired to absorb ultraviolet light rays. They may be applied over a sensitive layer or between sensitive layers of a multilayer photographic film or they may be applied to a finished photographic picture to prevent deterioration of the finished picture. They may be applied to materials, such as cellulose acetate sheeting or to other sheet material, to prevent action of ultraviolet light on the material or on the substance wrapped in it.

The following examples which are illustrative only indicate methods of coating an ultraviolet light filter according to our invention:

Example 1

A solution of the sodium salt of 3,5-dinitrobenzoic acid is prepared by dissolving 10 grams of the acid in 100 cc. of water containing 2.0 grams of sodium hydroxide. This solution is added to 100 cc. of a solution of gelatin in water containing 7% gelatin by weight. These are thoroughly mixed and coated on a sensitive photographic emulsion layer at a temperature of about 40° C., approximately 15 cc. of the solution being spread over 1000 square centimeters. Such a coating has an optical density higher than 2.0 at 390 mu and still greater at shorter wave lengths while the density at 420 mu is less than 0.20.

Example 2

A solution of the methyl ester of 3,5-dinitrobenzoic acid is prepared by dissolving 10 grams of the ester in 100 cc. of a solvent, such as methanol. This solution is mixed with 1000 cc. of a solution of polyvinyl acetate containing 10 grams of polyvinyl acetate per 100 cc. of solution in a suitable solvent such as ethyl alcohol. This is then spread over a glass plate at the rate of approximately 25 cc. per 1000 square centimeters and forms a layer which can be removed from the plate and used as a filter for absorbing ultraviolet light, such as a filter placed over the camera lens.

Our invention will now be described with particular reference to the accompanying drawing. As shown in the single figure of the drawing, a support 10 of any suitable material, such as cellulose acetate having thereon a sensitive emulsion layer 11 is coated with a filter layer 12 having dissolved therein 3,5-dinitrobenzoic acid or an ester or salt of 3,5-dinitrobenzoic acid. It will be understood that the film may have other layers, not shown, such as subbing or antihalation layers.

In addition to their use as light-filtering materials in an inert gelatin or colloidal layer, the 3,5-dinitrobenzoic acid or its esters or salts may be incorporated in a sensitive emulsion layer or may be incorporated in a layer of gelatin or other colloidal material used as a backing on the rear side of a photographic element. Other uses will suggest themselves to those skilled in the art. It is to be understood that our invention may be used in other ways not herein specifically mentioned and that our invention is to be taken as limited only by the scope of the appended claims.

We claim:

1. A photographic element having thereon a layer sensitive to ultraviolet and visible light rays and over said sensitive layer a layer of colloidal material containing a salt of 3,5-dinitrobenzoic acid.

2. A photographic element having thereon a gelatino-silver halide emulsion layer sensitive to ultraviolet and visible light rays and over said emulsion layer a layer of gelatin containing a salt of 3,5-dinitrobenzoic acid.

3. A photographic element having thereon a gelatino-silver halide emulsion layer sensitive to ultraviolet and visible light rays and over said emulsion layer a layer of gelatin containing the sodium salt of 3,5-dinitrobenzoic acid.

4. A photographic element having thereon a layer sensitive to ultra-violet and visible light rays and over said sensitive layer, a layer of colloidal material containing an ultra-violet-light-absorbing compound selected from the group consisting of 3,5-dinitro benzoic acid and the salts and esters of said acid.

GORDON H. BROWN.
PAUL W. VITTUM.
EDWIN E. JELLEY.

REFERENCES CITED

The following references are of record in the file of this patent:

UNITED STATES PATENTS

| Number | Name | Date |
| --- | --- | --- |
| 2,205,870 | Wilmanns et al. | June 25, 1940 |
| 2,372,935 | Challis | Apr. 3, 1945 |